United States Patent
Zhao et al.

(10) Patent No.: US 12,022,314 B2
(45) Date of Patent: Jun. 25, 2024

(54) QUALITY OF SERVICE MEASUREMENT METHOD AND DEVICE, AND USER PLANE FUNCTION ENTITY

(71) Applicant: CHINA TELECOM CORPORATION LIMITED, Beijing (CN)

(72) Inventors: Song Zhao, Beijing (CN); Peng Chen, Beijing (CN); Qi Bi, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 172 days.

(21) Appl. No.: 17/770,818

(22) PCT Filed: Jul. 3, 2020

(86) PCT No.: PCT/CN2020/100081
§ 371 (c)(1),
(2) Date: Apr. 21, 2022

(87) PCT Pub. No.: WO2021/077797
PCT Pub. Date: Apr. 29, 2021

(65) Prior Publication Data
US 2022/0377591 A1 Nov. 24, 2022

(30) Foreign Application Priority Data
Oct. 24, 2019 (CN) .......................... 201911014398.3

(51) Int. Cl.
*H04W 24/10* (2009.01)
*H04W 28/02* (2009.01)

(52) U.S. Cl.
CPC ....... *H04W 24/10* (2013.01); *H04W 28/0236* (2013.01)

(58) Field of Classification Search
CPC . H04W 24/10; H04W 28/0236; H04W 24/08; H04L 43/0823; H04L 43/0829;
(Continued)

(56) References Cited

U.S. PATENT DOCUMENTS

| 2018/0262924 A1 | 9/2018 | Dao |
| 2019/0215730 A1 | 7/2019 | Qiao et al. |

(Continued)

FOREIGN PATENT DOCUMENTS

| CN | 108632308 A | 10/2018 |
| CN | 110120878 A | 8/2019 |

(Continued)

OTHER PUBLICATIONS

Extended European Search Report issued in corresponding EuropeanPatent Application No. 20879716.7 dated Nov. 7, 2023; 9 pages.

(Continued)

*Primary Examiner* — Chuong A Ngo
(74) *Attorney, Agent, or Firm* — Andrew M. Calderon; Calderon Safran & Wright, P.C.

(57) ABSTRACT

The present disclosure relates to the technical field of 5G core networks, and provides a quality of service measurement method and device, a user plane function entity, and a computer-readable storage medium. The quality of service measurement method includes: a user plane function receiving a quality of service measurement request sent by a session management function, wherein the quality of service measurement request includes a trigger condition of a quality of service measurement failure and a measurement result of the quality of service measurement failure; the user plane function determining whether or not the trigger condition of the quality of service measurement failure is satisfied: and if so, the user plane function sending, to a control plane function, the measurement result of the quality of service measurement failure.

18 Claims, 2 Drawing Sheets

(58) Field of Classification Search
CPC . H04L 43/0852; H04L 41/0894; H04L 43/08; H04B 17/364
See application file for complete search history.

(56) References Cited

U.S. PATENT DOCUMENTS

| | | | |
|---|---|---|---|
| 2019/0253917 | A1 | 8/2019 | Dao |
| 2020/0112907 | A1* | 4/2020 | Dao ................ H04W 28/0268 |
| 2020/0367110 | A1 | 11/2020 | Dekui |

FOREIGN PATENT DOCUMENTS

| | | |
|---|---|---|
| WO | 2018161850 A1 | 9/2018 |
| WO | 2019029581 A1 | 2/2019 |
| WO | 2019/139752 A1 | 7/2019 |
| WO | 2019149080 A | 8/2019 |

OTHER PUBLICATIONS

Notice of the First Review Opinion issued in corresponding priority Chinese application No. 201911014398.3 dated Jan. 5, 2023; 14 pages.

Grant Notice issued in corresponding priority Chinese application No. 201911014398.3 dated Mar. 22, 2023; 6 pages.

International Search Report issued in corresponding Application No. PCT/CN2020/100081 mailed on Sep. 24, 2020.

Hua Wei et al. "Update the QoS Monitoring Solution for URLLC Service" Sa WG2 Meeting #129 S2-1810505, Oct. 9, 2018 (2018-10-09), pp. 1-8.

Hua Wei et al. "QoS Monitoring to Assist URLLC Service" 3GPP TSG-SA2 Meeting #134 S2-1908291, Jun. 25, 2019 (2019-06-25), pp. 1-8.

Office Action issued in corresponding Japanese Patent Application No. 2022-524131 dated Jul. 25, 2023; 6 pages.

NTT Docomo, Nokia, Nokia Shanghai Bell, UPF reporting the time comparison,3GPP TSG SA WG2 #135 S2 / 1908786, Oct. 7, 2019, 2015; 32 pages.

Huawei, HiSilicon, Correction on Policy Control information to support QoS Monitoring, 3GPP TSG SA WG2 #135 S2 / 1910593, Oct. 18, 2019, 2015; 28 pages.

Hua Wei et al. "Update the QoS Monitoring Solution for URLLC Service" SA WG2 Meeting #129 S2-1810505, Oct. 9, 2018 (Oct. 9, 2018), pp. 1-8; 8 pages.

Hua Wei et al. "QoS Monitoring to Assist URLLC Service" 3GPP TSG-SA2 Meeting #134 S2-1908291, Jun. 25, 2019 (Jun. 25, 2019), pp. 1-8; 8 pages.

International Preliminary Report and Written Opinion issued in corresponding Application No. PCT/CN2020/100081 dated Apr. 26, 2022, 4 pages.

\* cited by examiner

QUALITY OF SERVICE MEASUREMENT METHOD AND DEVICE, AND USER PLANE FUNCTION ENTITY

CROSS-REFERENCE TO RELATED APPLICATIONS

This application is a U.S. National Stage Application under 35 U.S.C. § 371 of International Patent Application No. PCT/CN2020/100081, filed on Jul. 3, 2020, which is based on and claims the priority to the Chinese patent application No. CN201911014398.3 filed on Oct. 24, 2019, the disclosure of both of which are hereby incorporated as a whole into the present application.

TECHNICAL FIELD

This disclosure relates to the technical field of 5G core network, and particularly, to a quality of service measurement method and device, a user plane function entity, and a computer-readable storage medium.

BACKGROUND

URLLC (Ultra Reliable & Low Latency Communication) service in 5G is sensitive to delay of data packets. Therefore, the 5G core network needs to perform QoS (Quality of Service) measurement, that is, to measure a packet delay of QoS flows of the URLLC service.

During the QoS measurement, it is needed to generate a QoS measurement data packet on a UPF (User Plane Function) entity, so as to measure the delay of the QoS flow of the URLLC service.

SUMMARY

According to an aspect of embodiments of the present disclosure, there is provided a quality of service measurement method, comprising: a user plane function entity receiving a quality of service measurement request sent by a session management function entity, wherein the quality of service measurement request comprises a trigger condition for quality of service measurement failure and a measurement result of the quality of service measurement failure; the user plane function entity judging whether the trigger condition for the quality of service measurement failure is met; and the user plane function entity sending the measurement result of the quality of service measurement failure to a policy control function entity when the trigger condition for the quality of service measurement failure is met.

In some embodiments, the trigger condition for the quality of service measurement failure is: the user plane function entity not receiving a corresponding quality of service measurement feedback data packet within a first preset duration after a quality of service measurement data packet is sent by the user plane function entity; and the user plane function entity sending the measurement result of the quality of service measurement failure to the policy control function entity comprises: the user plane function entity sending a second preset duration to the policy control function entity, wherein the second preset duration indicates that the quality of service measurement failure corresponding to the trigger condition occurs.

In some embodiments, the trigger condition for the quality of service measurement failure is: the user plane function entity not receiving a corresponding quality of service measurement feedback data packet within a first preset duration after a preset percentage of quality of service measurement data packets in a preset time period are sent by the user plane function entity; and the user plane function entity sending the measurement result of the quality of service measurement failure to the policy control function entity comprises: the user plane function entity sending a third preset duration to the policy control function entity, wherein the third preset duration indicates that the quality of service measurement failure corresponding to the trigger condition occurs.

In some embodiments, the first preset duration is greater than a packet delay budget for a quality of service flow.

In some embodiments, the user plane function entity not receiving the corresponding quality of service measurement feedback data packet within the first preset duration after the quality of service measurement data packet is sent by the user plane function entity comprises: a feedback delay of the corresponding quality of service measurement feedback data packet being greater than the first preset duration, or packet loss of the corresponding quality of service measurement feedback data packet occurring.

In some embodiments, the user plane function entity sending the measurement result of the quality of service measurement failure to the policy control function entity comprises: the user plane function entity sending the measurement result of the quality of service measurement failure to a policy control function entity.

In some embodiments, the user plane function entity sending the measurement result of the quality of service measurement failure to the policy control function entity comprises: the user plane function entity sending the measurement result of the quality of service measurement failure to the policy control function entity through the session management function entity, so that the policy control function entity forwards the measurement result of the quality of service measurement failure to an application function entity.

In some embodiments, the user plane function entity sending the measurement result of the quality of service measurement failure to the policy control function entity comprises: the user plane function entity sending the measurement result of the quality of service measurement failure to the session management function entity, so that the session management function entity forwards the measurement result of the quality of service measurement failure to an application function entity through a network exposure function entity.

According to another aspect of the embodiments of the present disclosure, there is provided a user plane function entity, comprising: a measurement request receiving module configured to receive a quality of service measurement request sent by a session management function entity, wherein the quality of service measurement request comprises a trigger condition for quality of service measurement failure and a measurement result of the quality of service measurement failure; a trigger condition judging module configured to judge whether the trigger condition for the quality of service measurement failure is met; and a measurement result sending module configured to send the measurement result of the quality of service measurement failure to a policy control function entity when the trigger condition for the quality of service measurement failure is met.

In some embodiments, the trigger condition for the quality of service measurement failure is: the user plane function entity not receiving a corresponding quality of service measurement feedback data packet within a first preset duration after a quality of service measurement data packet is sent by the user plane function entity; and the measurement result sending module is configured to: send a second preset duration to the policy control function entity, wherein the second preset duration indicates that the quality of service measurement failure corresponding to the trigger condition occurs.

In some embodiments, the trigger condition for the quality of service measurement failure is: the user plane function entity not receiving a corresponding quality of service measurement feedback data packet within a first preset duration after a preset percentage of quality of service measurement data packets in a preset time period are sent by the user plane function entity; and the measurement result sending module is configured to: send a third preset duration to the policy control function entity, wherein the third preset duration indicates that the quality of service measurement failure corresponding to the trigger condition occurs.

In some embodiments, the first preset duration is greater than a packet delay budget for a quality of service flow.

In some embodiments, the user plane function entity not receiving the corresponding quality of service measurement feedback data packet within the first preset duration after the quality of service measurement data packet is sent by the user plane function entity comprises: a feedback delay of the corresponding quality of service measurement feedback data packet being greater than the first preset duration, or packet loss of the corresponding quality of service measurement feedback data packet occurring.

In some embodiments, the measurement result sending module is configured to: send the measurement result of the quality of service measurement failure to a policy control function entity.

In some embodiments, the measurement result sending module is configured to: send the measurement result of the quality of service measurement failure to the policy control function entity through the session management function entity, so that the policy control function entity forwards the measurement result of the quality of service measurement failure to an application function entity.

In some embodiments, the measurement result sending module is configured to: send the measurement result of the quality of service measurement failure to the session management function entity, so that the session management function entity forwards the measurement result of the quality of service measurement failure to an application function entity through a network exposure function entity.

According to still another aspect of the embodiments of the present disclosure, there is provided a quality of service measurement device, comprising: a memory; and a processor coupled to the memory, the processor being configured to perform, based on instructions stored in the memory, the foregoing quality of service measurement method.

According to further another aspect of the embodiments of the present disclosure, there is provided a computer-readable storage medium, wherein the computer-readable storage medium has thereon stored computer instructions which, when executed by a processor, implement the foregoing quality of service measurement method.

Other features of the present disclosure and advantages thereof will become apparent from the following detailed description of exemplary embodiments thereof, which proceeds with reference to the accompanying drawings.

BRIEF DESCRIPTION OF THE DRAWINGS

In order to more clearly illustrate the embodiments of the present disclosure or technical solutions in related arts, the accompanying drawings used in the description of the embodiments or related arts will be briefly introduced below, it is obvious that the drawings in the description below are only some embodiments of the present disclosure, and for those skilled in the art, other drawings can also be obtained according to these drawings without making creative labor.

DETAILED DESCRIPTION

Technical solutions in the embodiments of the present disclosure will be described clearly and completely in conjunction with the drawings in the embodiments of the present disclosure, and it is obvious that the embodiments described are only some of the embodiments of the present disclosure, rather than all of them. The following description of at least one exemplary embodiment is merely illustrative in nature and is in no way intended to limit this disclosure and its application or use. All other embodiments, which are derived by one of ordinary skill in the art from the embodiments disclosed herein without making creative labor, shall fall within the scope of the present disclosure.

The inventors found that the URLLC service supports measurement of N3 interface delay by using a QoS measurement data packet. However, the measurement can work normally only when an access network can guarantee that the data packet delay of a service QoS flow does not exceed a PDB (packet delay budget). Specifically, when the access network cannot meet the PDB for the QoS flow, the measurement mechanism cannot work because the QoS measurement data packet for measuring a specific service will be transmitted as a data packet for that service. The QoS measurement data packet, when transmitted in the access network, will also be discarded by the access network if its transmission delay exceeds the PDB for the QoS flow. In this case, the existing QoS measurement method cannot obtain a QoS measurement result.

One technical problem to be solved by this disclosure is how to perform the quality of service measurement more comprehensively.

In view of this, the inventors deemed that detecting the QoS measurement failure of the QoS measurement data packet itself is a meaningful measurement for QoS. Therefore, the QoS measurement failure can be defined to avoid that the UPF cannot obtain the QoS measurement result due to the QoS measurement failure.

In the present disclosure, the quality of service measurement failure is defined, and the quality of service measurement result can be learned in the case of the quality of service measurement failure, thereby realizing the quality of service measurement more comprehensively.

Figure 1:
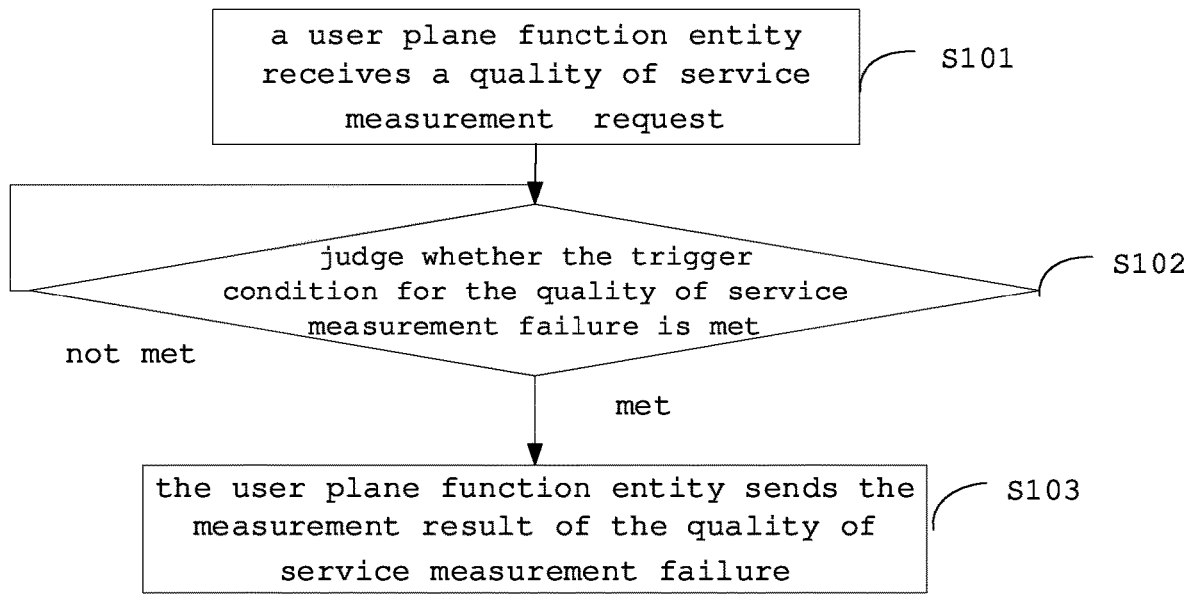
FIG. 1 shows a flow diagram of a quality of service measurement method according to some embodiments of the present disclosure.

First, some embodiments of the quality of service measurement method of the present disclosure are described in conjunction with FIG. 1.

FIG. 1 shows a flow diagram of a quality of service measurement method according to some embodiments of the present disclosure. As shown in FIG. 1, the embodiments comprises steps S101 to S104.

In the step S101, a user plane function entity receives a quality of service measurement request sent by a session management function entity, wherein the quality of service measurement request comprises a trigger condition for quality of service measurement failure and a measurement result of the quality of service measurement failure.

In a PDU (Protocol Data Unit) session establishment or modification process, a PCF (Policy control function) entity sends a QoS measurement policy to the SMF (Session Management Function) entity. The SMF will send a QoS measurement request to the UPF to request the UPF to perform the QoS measurement. The QoS measurement policy in the QoS measurement request can comprise a preset trigger condition for the QoS measurement failure and a measurement result of the QoS measurement failure, wherein the measurement result is taken as QoS measurement information reported by the UPF after the trigger condition for the QoS measurement failure is met.

In the step S102, the user plane function entity judges whether the trigger condition for the quality of service measurement failure is met.

When the UPF performs the QoS measurement according to the QoS measurement policy, if feedback of the quality of service measurement data packet is time out in a single QoS measurement process or feedback of the quality of service measurement data packet is time out in a plurality of QoS measurement processes, the UPF considers that the trigger condition for the QoS measurement failure is met.

When the trigger condition for the quality of service measurement failure is not met, the method returns to the step S102. When the trigger condition for the quality of service measurement failure is met, the step S103 is executed.

In the step S103, the user plane function entity sends the measurement result of the quality of service measurement failure.

When the UPF determines the QoS measurement failure, the UPF reports the QoS measurement result corresponding to the measurement failure condition in the QoS measurement policy.

In some embodiments, the user plane function entity sending the measurement result of the quality of service measurement failure to the policy control function entity comprises: the user plane function entity sending the measurement result of the quality of service measurement failure to a policy control function entity. The user plane function entity sending the measurement result of the quality of service measurement failure to the policy control function entity comprises: the user plane function entity sending the measurement result of the quality of service measurement failure to the policy control function entity through the session management function entity, so that the policy control function entity forwards the measurement result of the quality of service measurement failure to an application function entity.

In some embodiments, the user plane function entity sending the measurement result of the quality of service measurement failure to the policy control function entity comprises: the user plane function entity sending the measurement result of the quality of service measurement failure to the session management function entity, so that the session management function entity forwards the measurement result of the quality of service measurement failure to an application function entity through a network exposure function entity.

When packet loss of the QoS measurement data packet occurs due to abnormal situations (such as transmission timeout), a conventional QoS measurement method will not be continued, and the UPF cannot continue measuring a corresponding QoS index. In view of the above situation, in the embodiments, the defect of the conventional QoS measurement method can be overcome by defining the quality of service measurement failure, such that the UPF is enabled to feed the corresponding QoS measurement result back in the case of the quality of service measurement failure, thereby realizing the quality of service measurement more comprehensively. In addition, by designing a specific trigger condition for the QoS measurement failure, the QoS support capability and defective faults of the 5G network can be acquired more accurately.

Two specific application examples will be given below to illustrate a process in which the user plane function entity judges whether the trigger condition for the quality of service measurement failure is met, and a process in which the user plane function entity sends the measurement result of the quality of service measurement failure to the policy control function entity.

Application Example 1

The trigger condition for the quality of service measurement failure is: the user plane function entity not receiving a corresponding quality of service measurement feedback data packet within a first preset duration after a quality of service measurement data packet is sent by the user plane function entity; and when the trigger condition for the quality of service measurement failure is met, the user plane function entity sending a second preset duration to the policy control function entity, wherein the second preset duration indicates that the quality of service measurement failure corresponding to the trigger condition occurs.

For example, when the measurement on packet delay of one QoS measurement data packet in a QoS flow is performed, the QoS measurement policy can specify the following trigger condition for the QoS measurement failure: for a single QoS measurement data packet, specifying a unique time point value, wherein the time point value can be obtained through a sending time stamp of the QoS measurement data packet and one first preset duration for determining the QoS measurement failure. If the QoS measurement feedback data packet of the QoS measurement data packet corresponding to the time point value is not fed back to the UPF by a terminal or an access network when the time point value is reached, it is deemed that packet loss of the QoS measurement data packet occurs, resulting in the QoS measurement failure. For the trigger condition for such QoS measurement failure, the QoS measurement policy specifies that the measurement result of the QoS measurement data packet that is fed back by the UPF is the second preset duration, to indicate the QoS measurement failure.

It should be appreciated by those skilled in the art that it is needed that the first preset duration is greater than a packet delay budget for the quality of service flow, in order to take into account other factors causing the delay than the data packet transmission. The first preset duration can be taken as a default value of the second preset duration in the case of no special setting for the second preset duration.

Application Example 2

The trigger condition for the quality of service measurement failure is: the user plane function entity not receiving a corresponding quality of service measurement feedback data packet within a first preset duration after a preset percentage of quality of service measurement data packets in a preset time period are sent by the user plane function entity; and when the trigger condition for the quality of service measurement failure is met, the user plane function entity sending a third preset duration to the policy control function entity, wherein the third preset duration indicates that the quality of service measurement failure corresponding to the trigger condition occurs. The user plane function entity not receiving the corresponding quality of service measurement feedback data packet within the first preset duration after the quality of service measurement data packets are sent by the user plane function entity comprises: a feedback delay of the corresponding quality of service measurement feedback data packet being greater than the first preset duration, or packet loss of the corresponding quality of service measurement feedback data packet occurring.

The measurement policy can also define that a plurality of QoS measurement data packets need to be sent, and then a total result is obtained according to a measurement result obtained by each QoS measurement data packet. For example, within 1 hour, the QoS measurement is performed every 5 minutes, 12 times in total. The QoS measurement policy can define the following conditions for the measurement failure: for a single QoS measurement data packet, specifying a unique time point value, wherein the time point value can be obtained through a sending time stamp of the QoS measurement data packet and one first preset duration for determining the QoS measurement failure. If a QoS measurement feedback data packet of the QoS measurement data packet corresponding to the time point value is not fed back to the UPF when the time point is reached, it is deemed that packet loss of the QoS measurement data packet occurs. If packet loss of more than half (6) of the measurement data packets occurs, it can be considered that the QoS measurement result within 1 hour is measurement failure. For the trigger condition for such QoS measurement failure, the QoS measurement policy specifies that the measurement result of the QoS measurement data packet that is fed back by the UPF is the third preset duration, to indicate the QoS measurement failure.

It should be understood by those skilled in the art that the first preset duration can be taken as a default value for the second preset duration in the case of no special setting for the second preset duration. In addition, the third preset duration can also be set to be different from the second preset duration, to indicate that a trigger condition for different quality of service measurement failure is met.

Some embodiments of the user plane function entity of the present disclosure are described below in conjunction with FIG. 2.

Figure 2:
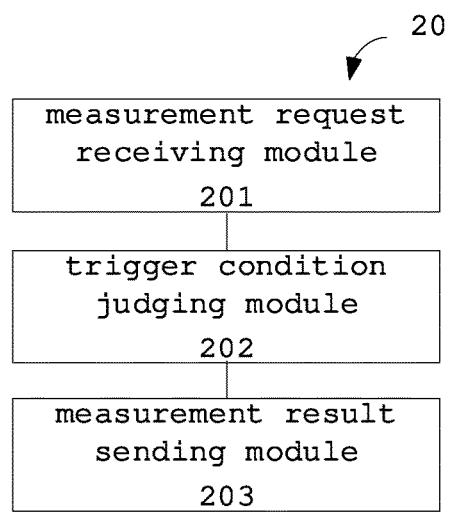
FIG. 2 shows a schematic structural diagram of a user plane function entity according to some embodiments of the present disclosure.

FIG. 2 shows a schematic structural diagram of a user plane function entity according to some embodiments of the present disclosure. As shown in FIG. 2, the user plane function entity 20 in the embodiments comprises:

a measurement request receiving module 201 configured to receive a quality of service measurement request sent by a session management function entity, wherein the quality of service measurement request comprises a trigger condition for quality of service measurement failure and a measurement result of the quality of service measurement failure; a trigger condition judging module 202 configured to judge whether the trigger condition for the quality of service measurement failure is met; and a measurement result sending module 203 configured to send the measurement result of the quality of service measurement failure to a policy control function entity when the trigger condition for the quality of service measurement failure is met.

In some embodiments, the trigger condition for the quality of service measurement failure is: the user plane function entity not receiving a corresponding quality of service measurement feedback data packet within a first preset duration after a quality of service measurement data packet is sent by the user plane function entity; and the measurement result sending module is configured to: send a second preset duration to the policy control function entity, wherein the second preset duration indicates that the quality of service measurement failure corresponding to the trigger condition occurs.

In some embodiments, the trigger condition for the quality of service measurement failure is: the user plane function entity not receiving a corresponding quality of service measurement feedback data packet within a first preset duration after a preset percentage of quality of service measurement data packets in a preset time period are sent by the user plane function entity; and the measurement result sending module is configured to: send a third preset duration to the policy control function entity, wherein the third preset duration indicates that the quality of service measurement failure corresponding to the trigger condition occurs.

In some embodiments, the first preset duration is greater than a packet delay budget for a quality of service flow.

In some embodiments, the user plane function entity not receiving the corresponding quality of service measurement feedback data packet within the first preset duration after the quality of service measurement data packet is sent by the user plane function entity comprises: a feedback delay of the corresponding quality of service measurement feedback data packet being greater than the first preset duration, or packet loss of the corresponding quality of service measurement feedback data packet occurring.

In some embodiments, the measurement result sending module is configured to: send the measurement result of the quality of service measurement failure to a policy control function entity.

In some embodiments, the measurement result sending module is configured to: send the measurement result of the quality of service measurement failure to the policy control function entity through the session management function entity, so that the policy control function entity forwards the measurement result of the quality of service measurement failure to an application function entity.

In some embodiments, the measurement result sending module is configured to: send the measurement result of the quality of service measurement failure to the session management function entity, so that the session management function entity forwards the measurement result of the quality of service measurement failure to an application function entity through a network exposure function entity.

In the embodiments, by defining the quality of service measurement failure, the UPF is enabled to feed the corresponding QoS measurement result back in the case of the quality of service measurement failure, thereby realizing the quality of service measurement more comprehensively. In addition, by designing a specific trigger condition for the QoS measurement failure, the QoS support capability and defective faults of the 5G network can be acquired more accurately.

Some embodiments of a quality of service measurement device of the present disclosure are described below in conjunction with FIG. 3.

Figure 3:
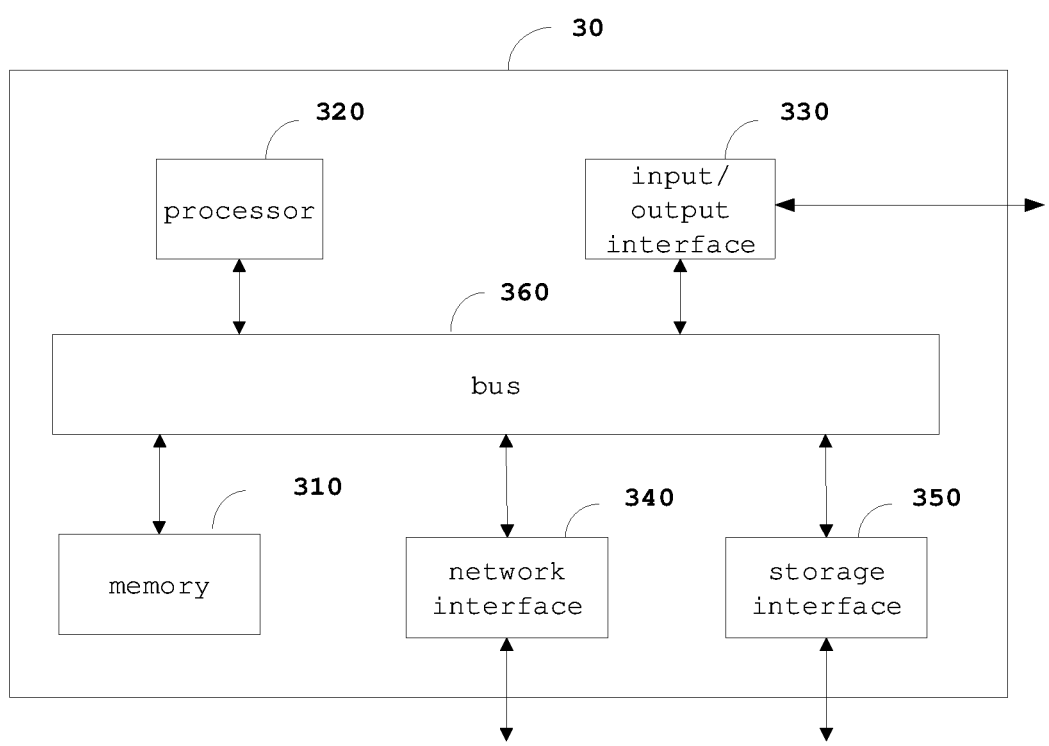
FIG. 3 shows a schematic structural diagram of a quality of service measurement device according to some embodiments of the present disclosure.

FIG. 3 shows a schematic structural diagram of a quality of service measurement device according to some embodiments of the present disclosure. As shown in FIG. 3, the quality of service measurement device 30 according to the embodiments comprises: a memory 310 and a processor 320 coupled to the memory 310, the processor 320 being configured to perform the quality of service measurement method in any of the foregoing embodiments based on instructions stored in the memory 310. It should be appreciated by those skilled in the art that the quality of service measurement device 30 specifically can be a user plane function entity.

The memory 310 can comprise, for example, a system memory, a fixed non-volatile storage medium, and so on. The system memory has thereon stored, for example, an operating system, an application program, a boot loader, other programs, and the like.

The quality of service measurement device 30 can further comprise an input/output interface 330, a network interface 340, a storage interface 350, and the like. These interfaces 330, 340, 350 and the memory 310 and the processor 320 can be connected, for example, through a bus 360. The input/output interface 330 provides a connection interface for input/output devices such as a display, a mouse, a keyboard, a touch screen, and the like. The network interface 340 provides a connection interface for various networking devices. The storage interface 350 provides a connection interface for external storage devices such as an SD card, a USB disk, and the like.

The present disclosure also comprises a computer-readable storage medium having stored thereon computer instructions which, when executed by a processor, implement the quality of service measurement method in any of the foregoing embodiments.

The present disclosure is described with reference to flow diagrams and/or block diagrams of the method, device (system), and computer program product according to the embodiments of the present disclosure. It should be understood that each flow and/or block of the flow diagrams and/or block diagrams, and a combination of flows and/or blocks in the flow diagrams and/or block diagrams, can be implemented by computer program instructions. These computer program instructions can be provided to a processor of a general-purpose computer, special-purpose computer, embedded processor, or other programmable data processing device to produce a machine, such that the instructions, which are executed through the processor of the computer or other programmable data processing devices, create means for implementing the function specified in one or more flows of the flow diagrams and/or one or more blocks of the block diagrams.

These computer program instructions can also be stored in a computer-readable memory that can guide the computer or other programmable data processing devices to work in a specific manner, such that the instructions stored in the computer-readable memory produce an article of manufacture comprising instruction means which implement the function specified in one or more flows of the flow diagrams and/or one or more blocks of the block diagrams.

These computer program instructions can also be loaded onto the computer or other programmable data processing devices, so that a series of operational steps are performed on the computer or other programmable device to produce computer-implemented processing, and therefore the instructions executed on the computer or other programmable devices provide steps for implementing the function specified in one or more flows of the flow diagrams and/or one or more blocks of the block diagrams.

The above description is only preferred embodiments of the present disclosure and is not intended to limit the present disclosure, and any modification, equivalent replacement, improvement, etc. made within the spirit and principle of the present disclosure are intended to be comprised in the protection scope of the present disclosure.

What is claimed is:

1. A quality of service measurement method, comprising:
  a user plane function entity receiving a quality of service measurement request sent by a session management function entity, wherein the quality of service measurement request comprises a trigger condition for quality of service measurement failure and a measurement result of the quality of service measurement failure;
  the user plane function entity performing a quality of service measurement and judging whether the trigger condition for the quality of service measurement failure is met; and
  the user plane function entity sending the measurement result of the quality of service measurement failure to a policy control function entity when the trigger condition for the quality of service measurement failure is met.

2. The quality of service measurement method according to claim 1, wherein the trigger condition for the quality of service measurement failure is: the user plane function entity not receiving a corresponding quality of service measurement feedback data packet within a first preset duration after a quality of service measurement data packet is sent by the user plane function entity; and
  the user plane function entity sending the measurement result of the quality of service measurement failure to the policy control function entity comprises: the user plane function entity sending a second preset duration to the policy control function entity, wherein the second preset duration indicates that the quality of service measurement failure corresponding to the trigger condition occurs.

3. The quality of service measurement method according to claim 2, wherein the first preset duration is greater than a packet delay budget for a quality of service flow.

4. The quality of service measurement method according to claim 2, wherein the user plane function entity not receiving the corresponding quality of service measurement feedback data packet within the first preset duration after the quality of service measurement data packet is sent by the user plane function entity comprises:
  a feedback delay of the corresponding quality of service measurement feedback data packet being greater than the first preset duration, or packet loss of the corresponding quality of service measurement feedback data packet occurring.

5. The quality of service measurement method according to claim 1, wherein the trigger condition for the quality of service measurement failure is: the user plane function entity not receiving a corresponding quality of service measurement feedback data packet within a first preset duration after a preset percentage of quality of service measurement data packets in a preset time period are sent by the user plane function entity; and
  the user plane function entity sending the measurement result of the quality of service measurement failure to the policy control function entity comprises: the user plane function entity sending a third preset duration to the policy control function entity, wherein the third preset duration indicates that the quality of service measurement failure corresponding to the trigger condition occurs.

6. The quality of service measurement method according to claim 1, wherein the user plane function entity sending the measurement result of the quality of service measurement failure to the policy control function entity comprises:
the user plane function entity sending the measurement result of the quality of service measurement failure to the policy control function entity through the session management function entity, so that the policy control function entity forwards the measurement result of the quality of service measurement failure to an application function entity.

7. The quality of service measurement method according to claim 1, further comprising:
the user plane function entity sending the measurement result of the quality of service measurement failure to the session management function entity, so that the session management function entity forwards the measurement result of the quality of service measurement failure to an application function entity through a network exposure function entity.

8. A non-transient computer-readable storage medium, wherein the computer-readable storage medium has thereon stored computer instructions which, when executed by a processor, implement the quality of service measurement method according to claim 1.

9. A user plane function entity, comprising:
a measurement request receiving module configured to receive a quality of service measurement request sent by a session management function entity, wherein the quality of service measurement request comprises a trigger condition for quality of service measurement failure and a measurement result of the quality of service measurement failure;
a trigger condition judging module configured to perform a quality of service measurement and judge whether the trigger condition for the quality of service measurement failure is met; and
a measurement result sending module configured to send the measurement result of the quality of service measurement failure to a policy control function entity when the trigger condition for the quality of service measurement failure is met.

10. The user plane function entity according to claim 9, wherein the trigger condition for the quality of service measurement failure is: the user plane function entity not receiving a corresponding quality of service measurement feedback data packet within a first preset duration after a quality of service measurement data packet is sent by the user plane function entity; and
the measurement result sending module is configured to: send a second preset duration to the policy control function entity, wherein the second preset duration indicates that the quality of service measurement failure corresponding to the trigger condition occurs.

11. The user plane function entity according to claim 10, wherein the first preset duration is greater than a packet delay budget for a quality of service flow.

12. The user plane function entity according to claim 10, wherein the user plane function entity not receiving the corresponding quality of service measurement feedback data packet within the first preset duration after the quality of service measurement data packet is sent by the user plane function entity comprises:
a feedback delay of the corresponding quality of service measurement feedback data packet being greater than the first preset duration, or packet loss of the corresponding quality of service measurement feedback data packet occurring.

13. The user plane function entity according to claim 9, wherein the trigger condition for the quality of service measurement failure is: the user plane function entity not receiving a corresponding quality of service measurement feedback data packet within a first preset duration after a preset percentage of quality of service measurement data packets in a preset time period are sent by the user plane function entity; and
the measurement result sending module is configured to: send a third preset duration to the policy control function entity, wherein the third preset duration indicates that the quality of service measurement failure corresponding to the trigger condition occurs.

14. The user plane function entity according to claim 9, wherein the measurement result sending module is configured to: send the measurement result of the quality of service measurement failure to the policy control function entity through the session management function entity, so that the policy control function entity forwards the measurement result of the quality of service measurement failure to an application function entity.

15. The user plane function entity according to claim 9, wherein the measurement result sending module is configured to: send the measurement result of the quality of service measurement failure to the session management function entity, so that the session management function entity forwards the measurement result of the quality of service measurement failure to an application function entity through a network exposure function entity.

16. A quality of service measurement device, comprising:
a memory; and
a processor coupled to the memory, the processor being configured to perform, based on instructions stored in the memory, the quality of service measurement method comprising:
receiving a quality of service measurement request sent by a session management function entity, wherein the quality of service measurement request comprises a trigger condition for quality of service measurement failure and a measurement result of the quality of service measurement failure;
performing a quality of service measurement and judging whether the trigger condition for the quality of service measurement failure is met; and
sending the measurement result of the quality of service measurement failure to a policy control function entity when the trigger condition for the quality of service measurement failure is met.

17. The quality of service measurement device according to claim 16, wherein the trigger condition for the quality of service measurement failure is: not receiving a corresponding quality of service measurement feedback data packet within a first preset duration after a quality of service measurement data packet is sent; and
sending the measurement result of the quality of service measurement failure to the policy control function entity comprises: sending a second preset duration to the policy control function entity, wherein the second preset duration indicates that the quality of service measurement failure corresponding to the trigger condition occurs.

18. The quality of service measurement device according to claim 16, wherein the trigger condition for the quality of service measurement failure is: not receiving a corresponding quality of service measurement feedback data packet within a first preset duration after a preset percentage of quality of service measurement data packets in a preset time period are sent; and sending the measurement result of the quality of service measurement failure to the policy control function entity comprises: sending a third preset duration to the policy control function entity, wherein the third preset duration indicates that the quality of service measurement failure corresponding to the trigger condition occurs.

* * * * *